(12) United States Patent
Wang

(10) Patent No.: US 9,266,494 B2
(45) Date of Patent: Feb. 23, 2016

(54) FOLD OVER DESIGN FOR SMALL OVERLAP

(71) Applicant: Autoliv ASP, Inc., Ogden, UT (US)

(72) Inventor: Xiaohong Wang, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/833,440

(22) Filed: Mar. 15, 2013

(65) Prior Publication Data

US 2014/0265270 A1 Sep. 18, 2014

(51) Int. Cl.
| | |
|---|---|
| *B60R 21/237* | (2006.01) |
| *B60R 21/213* | (2011.01) |
| *B60R 21/231* | (2011.01) |
| *B60R 21/232* | (2011.01) |
| *B60R 21/2338* | (2011.01) |

(52) U.S. Cl.
CPC .......... *B60R 21/237* (2013.01); *B60R 21/213* (2013.01); *B60R 21/232* (2013.01); *B60R 21/2338* (2013.01); *B60R 2021/23388* (2013.01); *Y10T 29/49826* (2015.01)

(58) Field of Classification Search
CPC ............... B60R 21/232; B60R 21/213; B60R 21/23138; B60R 21/2338; B60R 21/237; B60R 2021/23388; Y10T 29/49826
USPC ............................................. 280/730.2, 743.2
See application file for complete search history.

(56) References Cited

U.S. PATENT DOCUMENTS

| | | | |
|---|---|---|---|
| 5,636,862 A | 6/1997 | Cheung et al. | |
| 5,791,685 A | 8/1998 | Lachat et al. | |
| 6,234,516 B1 | 5/2001 | Boxey | |
| 6,237,943 B1 | 5/2001 | Brown et al. | |
| 6,343,811 B1 | 2/2002 | Hammer et al. | |
| 6,361,068 B1 | 3/2002 | Stein et al. | |
| 6,565,118 B2 | 5/2003 | Bakhsh et al. | |
| 6,709,008 B2 | 3/2004 | McGee et al. | |
| 7,093,854 B2 | 8/2006 | Fischer et al. | |
| 7,325,826 B2 | 2/2008 | Noguchi et al. | |
| 7,549,672 B2 | 6/2009 | Sato et al. | |
| 7,556,290 B2 | 7/2009 | Williams et al. | |
| 7,621,561 B2 | 11/2009 | Thomas et al. | |
| 7,628,421 B2 * | 12/2009 | Wright ...................... | 280/730.2 |

(Continued)

FOREIGN PATENT DOCUMENTS

| | | |
|---|---|---|
| EP | 1824710 | 8/2007 |
| EP | 1781508 B1 | 9/2009 |

(Continued)

*Primary Examiner* — Paul N Dickson
*Assistant Examiner* — Joselynn Y Sliteris
(74) *Attorney, Agent, or Firm* — Madson IP, P.C.

(57) ABSTRACT

An airbag assembly may include an inflatable curtain airbag with a stowed configuration and a deployed configuration. The inflatable curtain may have a first protection zone and a second protection zone that inflates forward of the first protection zone to provide enhanced protection. The second protection zone may be folded against the first protection zone so that, during deployment, the second protection zone pivots to unfold relative to the first protection zone. The airbag assembly may have a forward tether that provides longitudinal tension on the inflatable curtain airbag. The forward tether may be secured to the A-pillar of the vehicle and to a divider between the first and second protection zones so that deformation of the A-pillar may relieve the tension to allow the second protection zone to pivot inboard to provide protection from injuries that may be sustained in a small overlap or oblique collision.

19 Claims, 8 Drawing Sheets

(56) References Cited

U.S. PATENT DOCUMENTS

| | | |
|---|---|---|
| 7,712,773 B2 | 5/2010 | Walston |
| 7,712,774 B2 | 5/2010 | Garner et al. |
| 7,762,578 B2 | 7/2010 | Dix |
| 7,823,922 B2 | 11/2010 | Mitchell et al. |
| 7,841,621 B2 | 11/2010 | Dix |
| 8,262,130 B2 | 9/2012 | Fischer et al. |
| 8,272,664 B2 | 9/2012 | Benny et al. |
| 8,282,124 B2 * | 10/2012 | Trovato et al. ............. 280/730.2 |
| 2007/0152435 A1 | 7/2007 | Jamison et al. |
| 2009/0033081 A1 | 2/2009 | Flischer et al. |
| 2010/0013203 A1 | 1/2010 | Mitchell et al. |
| 2010/0237597 A1 | 9/2010 | Dix |
| 2011/0285117 A1 | 11/2011 | Shamoto |
| 2012/0256401 A1 | 10/2012 | Kato et al. |
| 2012/0267883 A1 | 10/2012 | Fischer et al. |
| 2012/0280478 A1 | 11/2012 | Fink |
| 2012/0286499 A1 | 11/2012 | Wiik et al. |
| 2014/0217710 A1 * | 8/2014 | Fukawatase et al. ...... 280/730.2 |
| 2014/0239619 A1 * | 8/2014 | Fukawatase et al. ...... 280/730.2 |

FOREIGN PATENT DOCUMENTS

| | | | |
|---|---|---|---|
| JP | 2012020719 A1 * | 2/2012 | .......... B60R 21/2338 |
| WO | WO2012/091656 | 7/2012 | |

* cited by examiner

FOLD OVER DESIGN FOR SMALL OVERLAP

TECHNICAL FIELD

The present invention relates to automotive safety. More specifically, the present invention relates to inflatable airbag curtains and methods that provide enhanced protection for collisions such as small overlap and oblique frontal collisions, rollovers, and side impact collisions.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

Airbag systems have also been developed in response to the need for similar protection from lateral impacts between a passenger and the side of a vehicle's interior. This might occur when another vehicle collides with the side of the car, or in a rollover situation where the side of car is repeatedly impacting the ground. Side impact airbags are often called "inflatable curtains." Many inflatable curtains are stowed along the corner where the vehicle roof meets the side windows and pillars. These inflatable curtains may be stowed behind the headliner trim at the edge of the headliner, which is the fabric covering the roof of the vehicle.

Recent safety standards issued by various governments require more comprehensive protection in the event of a side or frontal collision. Additionally, there is an ongoing need to provide airbag systems that are economical to manufacture and install, avoid interference with the ability of the automaker to position various features on the vehicle interior, and can be expected to deploy reliably. The passengers of a vehicle may be at any of a wide variety of positions within the vehicle at the time of deployment, so it is desirable to provide airbag systems that protect against impact over the broadest possible range of occupant locations.

It has been observed that some existing inflatable curtain designs do not provide adequate protection in the event of certain collision events, such as rollover collisions. In a rollover collision, the position and trajectory of vehicle occupants is difficult to predict. Accordingly, known inflatable curtains designed to protect against a pure lateral impact may not be in the proper position to provide the protection that is most needed. The result may be injuries from impact with interior vehicle surfaces and/or ejection from the vehicle, despite deployment of the airbag systems.

Additionally, one safety need that has recently become apparent is the need for enhanced protection in the event of "small overlap" and "oblique" collisions. A small overlap collision is a frontal collision in which the impact occurs on a relatively narrow portion on the left or right side of the front of the vehicle. An oblique collision is a frontal collision in which the impact occurs at an angle from head-on and on a relatively narrow portion on the left or right side of the front of the vehicle. Such collisions may lead to greater deformation of the vehicle structure on the side on which the impact occurs. Also, such collisions tend to cause the center of the vehicle to rotate away from the line of travel which can cause the vehicle occupant to move in a forward outboard trajectory. Additionally, existing airbag systems may not sufficiently protect against small overlap and oblique collisions because the trajectory of the occupants within the vehicle may be different from those for which the airbag systems are designed to provide protection. For example, in a vehicle with a driver's side airbag and an inflatable curtain airbag, the driver's head may move forward with a vector that has forward and lateral components so that the head tends to move between the deployed driver's side airbag and the deployed inflatable curtain airbag. This may cause the driver's head to strike the A-pillar or the instrument panel of the vehicle in spite of the deployment of the airbag systems.

SUMMARY OF THE INVENTION

The various systems and methods of the present invention have been developed in response to the present state of the art, and in particular, in response to the problems and needs in the art that have not yet been fully solved by currently available airbag systems and methods. Overall, the present invention provides airbag systems and methods that provide reliable protection for vehicle occupants in a wide variety of collision situations. Further, the present invention minimizes manufacturing and installation costs. The present invention may have other benefits that are not specifically set forth herein.

To achieve the foregoing, and in accordance with the invention as embodied and broadly described herein, an airbag assembly may be disposed in a vehicle to shield a vehicle occupant from impacting at least one lateral surface of the vehicle. The airbag assembly may include an inflatable curtain airbag having a stowed configuration proximate a roof of the vehicle and a deployed configuration into which the inflatable curtain airbag deploys downward between the vehicle occupant and the at least one lateral surface of the vehicle. The inflatable curtain airbag may have a first protection zone with a first interior chamber, and a second protection zone with a second interior chamber in fluid communication with the first interior chamber. In the stowed configuration, the inflatable curtain airbag may be folded at a stowed fold line such that the second protection zone lies alongside a portion of the first protection zone. During deployment, the inflatable curtain airbag may unfold such that the second protection zone moves forward to be positioned forward of the first protection zone in the deployed configuration, and the second protection zone may extend to a height proximate the roof of the vehicle.

The inflatable curtain may have a top edge that extends along the first protection zone and the second protection zone. In the deployed configuration, the top edge may be substantially parallel to the roof of the vehicle. In the stowed configuration, the first and second protection zones may be rolled together after folding of the inflatable curtain airbag at the stowed fold line. In the stowed configuration, the stowed fold line may define a forward edge of the inflatable curtain airbag. In the deployed configuration, the second protection zone may be positioned between an occupant zone that would ordinarily be occupied by a vehicle occupant's head and at least one of an A-pillar of the vehicle and a portion of an instrument panel of the vehicle.

The inflatable curtain airbag may have a deployed fold line that is a divider that defines the first interior chamber as distinct from the second interior chamber. In the deployed configuration, the second protection zone may be unfolded at the deployed fold line to define an angle less than 180° relative to the first protection zone. The airbag assembly may further have a forward tether with a first end secured to the inflatable curtain airbag and a second end securable to an A-pillar of the vehicle. The second end of the forward tether may be secured to an anchoring location on the A-pillar that is likely to move rearward in response to deflection of the A-pillar during a small overlap collision to release tension in the forward tether, thereby facilitating inboard positioning of the second protection zone.

The first end of the forward tether may be secured proximate the deployed fold line so that release of tension in the tether facilitates inboard pivoting of the second protection zone. The airbag assembly may further have a forward tether with a first end secured to the inflatable curtain airbag and a second end securable to an A-pillar of the vehicle, and a plurality of mounting assemblies distributed along a length of the inflatable curtain airbag to facilitate attachment of the inflatable curtain airbag to the vehicle. In the stowed configuration, all of the plurality of mounting assemblies may be positioned rearward of the A-pillar so that the second end of the forward tether is the only feature of the airbag assembly that is secured to the A-pillar.

The airbag assembly may further have an inflator that produces gas in response to detection of impact to trigger deployment of the inflatable curtain airbag, and a rearward tether with a first end secured to the inflatable curtain airbag and a second end securable to the vehicle rearward of the inflatable curtain airbag. In the deployed configuration, the rearward tether and the forward tether may cooperate to keep the first protection zone under tension in a longitudinal direction.

According to one method for stowing an airbag assembly for protecting a vehicle occupant in a vehicle having a lateral surface, the method may include providing an inflatable curtain airbag with a first protection zone having a first interior chamber and a second protection zone having a second interior chamber in fluid communication with the first interior chamber, folding the inflatable curtain airbag at a stowed fold line such that the second protection zone overlies at least a portion of the first protection zone, compacting the inflatable curtain airbag into a generally elongated shape, and securing the inflatable curtain airbag proximate a roof of the vehicle. In response to introduction of inflation gas into the inflatable curtain airbag, the first protection zone may expand downward to be positioned between the vehicle occupant and the lateral surface of the vehicle and the second protection zone may unfold forward of the first protection zone. The inflatable curtain airbag may have a deployed fold line that is a divider that defines the first interior chamber as distinct from the second interior chamber. Unfolding the second protection zone forward of the first protection zone may include maintaining the second protection zone unfolded at the deployed fold line to define an angle less than 180° relative to the first protection zone.

The inflatable curtain airbag may have a top edge that extends along the first protection zone and the second protection zone. Unfolding the second protection zone forward of the first protection zone may include positioning the top edge of the second protection zone substantially parallel to the roof of the vehicle. Securing the inflatable curtain airbag to the vehicle may include positioning the inflatable curtain airbag such that, prior to deployment, the stowed fold line defines a forward edge of the inflatable curtain airbag. Unfolding the second protection zone forward of the first protection zone may include positioning the second protection zone between an occupant zone that would ordinarily be occupied by the vehicle occupant's head and at least one of an A-pillar of the vehicle and a portion of an instrument panel of the vehicle.

The method may further include securing a first end of a forward tether to the inflatable curtain airbag, and securing a second end of the forward tether to an A-pillar of the vehicle. Securing the first end of the forward tether to the inflatable curtain airbag may include securing the first end proximate the deployed fold line so that release of tension in the tether facilitates inboard pivoting of the second protection zone. Securing the second end of the forward tether to the A-pillar may include securing the second end of the forward tether to an anchoring location on the A-pillar that is likely to move rearward in response to deflection of the A-pillar during a small overlap collision to release tension in the forward tether, thereby facilitating inboard positioning of the second protection zone. Securing the inflatable curtain airbag to the vehicle may include attaching a plurality of mounting assemblies distributed along a length of the inflatable curtain airbag to the vehicle rearward of the A-pillar so that the second end of the forward tether is the only feature of the airbag assembly that is secured to the A-pillar.

An airbag assembly may include an inflatable curtain airbag stowed proximate a roof of a vehicle. The inflatable curtain airbag may have a first protection zone and a second protection zone folded against the first protection zone such that the second protection zone overlies at least a portion of the first protection zone. The airbag assembly may further include an inflator in fluid communication with a first chamber within the first protection zone and a second chamber within the second protection zone, a plurality of mounting assemblies that secure the first protection zone to the vehicle, and a forward tether with a first end secured to the inflatable curtain airbag and a second end secured to an A-pillar of the vehicle. In response to production of gas by the inflator, the inflatable curtain airbag may expand downward such that the first protection zone is positioned between an occupant zone that would ordinarily be occupied by a vehicle occupant's head and a lateral surface of the vehicle. In response to production of the gas, the second protection zone may pivot forward of the first protection zone such that the second protection zone is positioned between the occupant zone and at least one of an A-pillar of the vehicle and a portion of an instrument panel of the vehicle. All of the plurality of mounting assemblies may be positioned rearward of the A-pillar so that the second end of the forward tether is the only feature of the airbag assembly that is secured to the A-pillar.

After deployment of the inflatable curtain airbag, the second protection zone may extend to a height proximate the roof of the vehicle. After deployment of the inflatable curtain airbag, the top edge of the second protection zone may be substantially parallel to the roof of the vehicle. The inflatable curtain airbag may have a deployed fold line that is a divider that defines a first interior chamber within the first protection zone as distinct from a second interior chamber within the second protection zone. After deployment, the second protection zone may be unfolded at the deployed fold line to define an angle less than 180° relative to the first protection zone. The second end of the forward tether may be secured to an anchoring location on the A-pillar that is likely to move rearward in response to deflection of the A-pillar during a small overlap collision to release tension in the forward tether, thereby facilitating inboard positioning of the second protection.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative exemplary of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
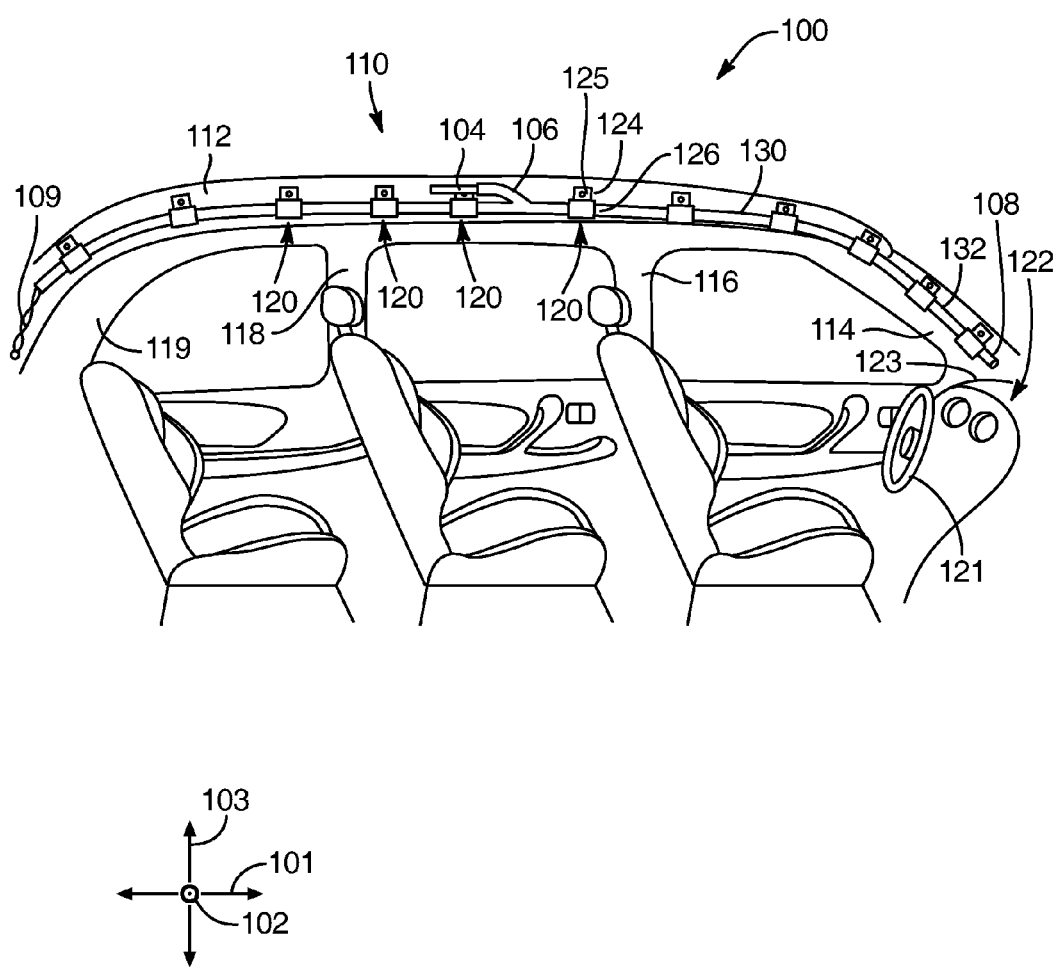
FIG. 1 is a side elevation view of an airbag assembly in a stowed configuration within a vehicle according to one embodiment of the invention.

Referring to FIG. 1, an airbag assembly 100 may be used to protect the passengers of a vehicle during a side collision or roll-over collision. The vehicle may have a longitudinal direction 101 oriented along the length of the vehicle, a lateral direction 102 oriented from one side of the vehicle to the opposing side, e.g., into and out of the page in the view of FIG. 1, and a transverse direction 103 oriented upward and downward. The terms "inboard" and "outboard" may be used to refer to the position of an object along the lateral direction 102. "Outboard" relates to placement of an object relatively closer than a second object to a lateral plane of the vehicle, which is either of two planes perpendicular to the lateral direction 102, one of which barely touches the very leftward terminus of the vehicle, and the other of which barely touches the very rightward terminus of the vehicle. "Inboard" relates to placement of an object relatively closer than a second object to a medial plane of the vehicle, which is the plane perpendicular to the lateral direction 102 that bisects the vehicle into two equal halves. "Inboard" and "outboard" do not require alignment of the two objects in the lateral direction 102; rather, these terms simply relate to proximity to the lateral or medial planes as set forth above.

The terms "rearward" and "forward" relate to the relative positions of the objects along the longitudinal direction 101. "Forward" relates to placement of an object relatively closer than a second object to a frontal plane of the vehicle, which is a plane perpendicular to the longitudinal direction 101 that barely touches the very frontward terminus of the vehicle. Similarly, "rearward" relates to placement of an object relatively closer than another object to a rear plane of the vehicle, which is a plane perpendicular to the longitudinal direction 101 that barely touches the very rearward terminus of the vehicle. An object that is "forward" of a second object need not be aligned with the second object in the longitudinal direction 101; it simply means that the first object is closer to the frontal plane of the vehicle than the second object. The term "rearward" similarly does not require alignment in the longitudinal direction 101.

The term "lateral" refers to a direction, object, or surface that pertains to the lateral direction 102. The "lateral surfaces" of the vehicle are the interior surfaces of the vehicle that face generally (but not necessarily precisely) toward the medial plane of the vehicle.

The airbag assembly 100 may include an inflator 104, a tube 106, and an inflatable curtain airbag 110 that receives gas from the inflator 104 via the tube 106. The airbag assembly 100 may also have a sensor and a control system (not shown) that detects a collision or impending collision and transmits an activation signal to the inflator 104. The inflator 104 may be one of several types, such as pyrotechnic, stored gas, or a combination inflator and may be a single or multistage inflator. The inflator 104 may be stored at any suitable location relative to the inflatable curtain airbag 110. If the inflator 104 is a pyrotechnic inflator, the inflator 104 may contain a propellant that ignites to rapidly produce inflation gas in response to receipt of the activation signal.

The inflatable curtain airbag 110 may extend along the longitudinal direction 101 within the vehicle. The inflatable curtain airbag 110 may be coupled to or next to a roof rail 112 of the vehicle. The airbag assembly 100 may also include a forward tether 108 and a rearward tether 109 that are coupled proximate the front and rear ends, respectively, of the inflatable curtain airbag 110. Upon inflation of the inflatable curtain airbag 110, the forward tether 108 and the rearward tether 109 may provide tension that helps keep the inflatable curtain airbag 110 in place.

In the event of a collision, the inflatable curtain airbag 110 may expand downward along the side of the vehicle between the vehicle passengers and one or more lateral surfaces of the vehicle such as the side windows and pillars (the structures between the lateral windows and/or the windshield and rear window) of the vehicle. The pillars may include an A-pillar 114, a B-pillar 116, a C-pillar 118, and, if present, a D-pillar 119, all of which may join the roof rail at their upper ends. In some embodiments, an inflatable curtain airbag may extend from an A-pillar to a C-pillar of the vehicle. In other embodiments such as that illustrated in FIG. 1, the inflatable curtain airbag 110 may extend from the A-pillar 114 to a D-pillar 119 of the vehicle.

In addition to the airbag assembly 100, other airbags may be installed in the vehicle. For example, a separate driver's side airbag (not shown in FIG. 1) may be used to protect an occupant (i.e., the driver) from impact with various forward surfaces of the vehicle, including the steering wheel 121 and instrument panel 122. The airbag assembly 100 may provide supplemental protection by cushioning impact not only against the lateral surfaces mentioned previously, but also cushioning impact against the A-pillar and/or an outboard portion 123 of the instrument panel 122. The outboard portion 123 is the portion of the instrument panel 122 that lies generally outboard of the steering wheel 121.

The inflatable curtain airbag 110 may normally reside in a stowed configuration, in which the inflatable curtain airbag 110 is concealed behind the interior trim of the vehicle, such as the lateral headliner trim (the trim that covers the edges of the headliner, which is typically a sheet of fabric that covers the interior of the vehicle roof). Prior to installation in the vehicle, the inflatable curtain airbag 110 may be compacted into the stowed configuration, such as by rolling, folding, or a combination thereof, such that the inflatable curtain airbag 110 assumes an elongated shape extending along a pathway with a length that is much greater than the height or width of its cross-sectional shape.

Once compacted into the stowed configuration, the inflatable curtain airbag 110 may be retained in the stowed configuration through the use of wrappers, fasteners, or the like to facilitate shipping and installation. The inflatable curtain airbag 110 may be secured to the vehicle proximate the roof rail 112. In the embodiment of FIG. 1, integrated wrappers and fastening systems may be provided in the form of a plurality of mounting assemblies 120 distributed along the length of the inflatable curtain airbag 110. Each of the mounting assemblies 120 may include a tab 124 secured to the inflatable curtain airbag 110, a fastener 125 that secures the tab 124 to the roof rail 112, and a wrapper 126 that encircles the inflatable curtain airbag 110 to keep the inflatable curtain airbag 110 in the stowed configuration until deployment.

In alternative embodiments, different mounting assemblies may be used. Such mounting assemblies may include tabs that are integrally formed with the inflatable curtain airbag, alternative fasteners, or the like. The wrappers 126 may not be present in all embodiments; other embodiments may utilize different features or attachment methods to keep the inflatable curtain airbag compacted. Such wrappers or other features may be independent of the mounting assemblies used to secure the inflatable curtain airbag to the vehicle.

As shown, the inflatable curtain airbag 110 may have a first protection zone 130 secured to the roof rail 112 and a second protection zone 132 secured to the pillar 114. Thus, the mounting assemblies 120 may be arranged along the length of the inflatable curtain airbag 110 from a rear location on or near the D-pillar to a forward location proximate a forward end of the A-pillar 114.

Upon activation, the inflator 104 may generate and/or release inflation gas into the tube 106. From the tube 106, the inflation gas may rapidly enter the inflatable curtain airbag 110, thereby causing the inflatable curtain airbag 110 to begin expanding. In response to the expansion, the wrappers 126 may break to release the inflatable curtain airbag 110. Thus, the inflatable curtain airbag 110 may exit the stowed configuration and assume an extended shape. This process is called "deployment." When deployment is complete, the inflatable curtain airbag 110 may be said to be in a deployed configuration, as will be shown and described in FIG. 2.

Figure 2:
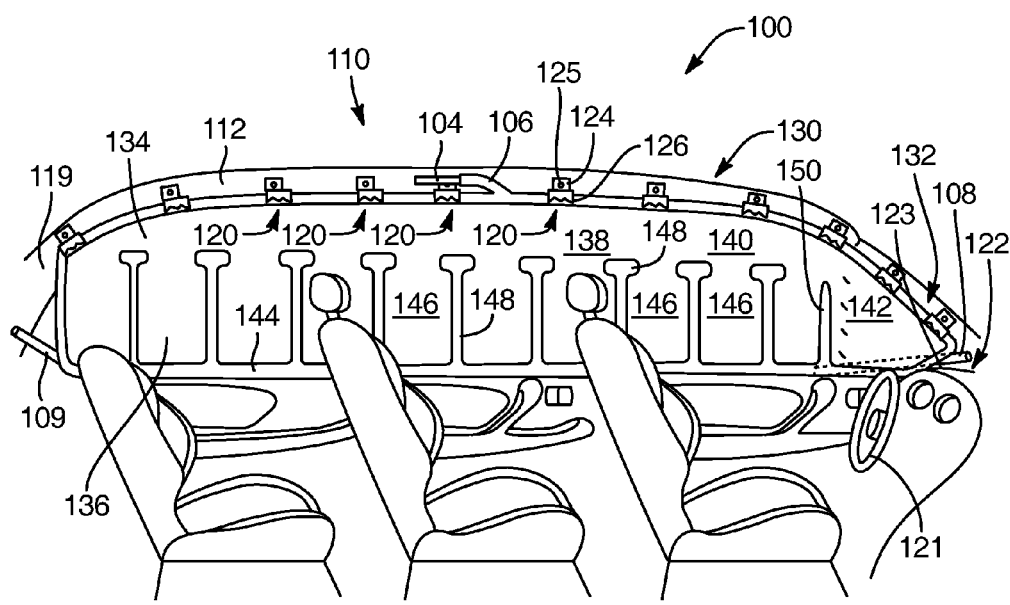
FIG. 2 is a side elevation view of the airbag assembly of FIG. 1, wherein the inflatable curtain airbag is in a deployed configuration.
Figure 2:
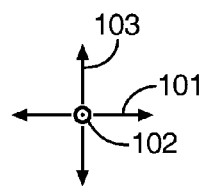

Referring to FIG. 2, a perspective view illustrates the airbag assembly 100, wherein the inflatable curtain airbag 110 is in the deployed configuration. The inflatable curtain airbag 110 may inflate upon activation of the inflator 104 and/or other optional inflators such that the inflatable curtain airbag 110 transitions from the stowed configuration to the deployed configuration. During deployment, the wrapper 126 may tear such that inflatable curtain airbag 110 can exit the stowed configuration. The inflatable curtain airbag 110 may also extend past a B-pillar 116 and a C-pillar 118 such that in a deployed configuration, the inflatable curtain airbag at least partially covers the B-pillar 116 and the C-pillar 118, as depicted in FIG. 2. The inflatable curtain airbag 110 may also cover a portion of the D-pillar 119.

FIG. 2 illustrates the positioning of the first protection zone 130 and the second protection zone 132. The first protection zone 130 may generally cover the lateral surfaces of the vehicle from the steering wheel rearward, while the second protection zone 132 covers the lateral surfaces forward of the steering wheel. The inflatable curtain airbag 110 may have an upper portion 134 and a lower portion 136.

Figure 3:
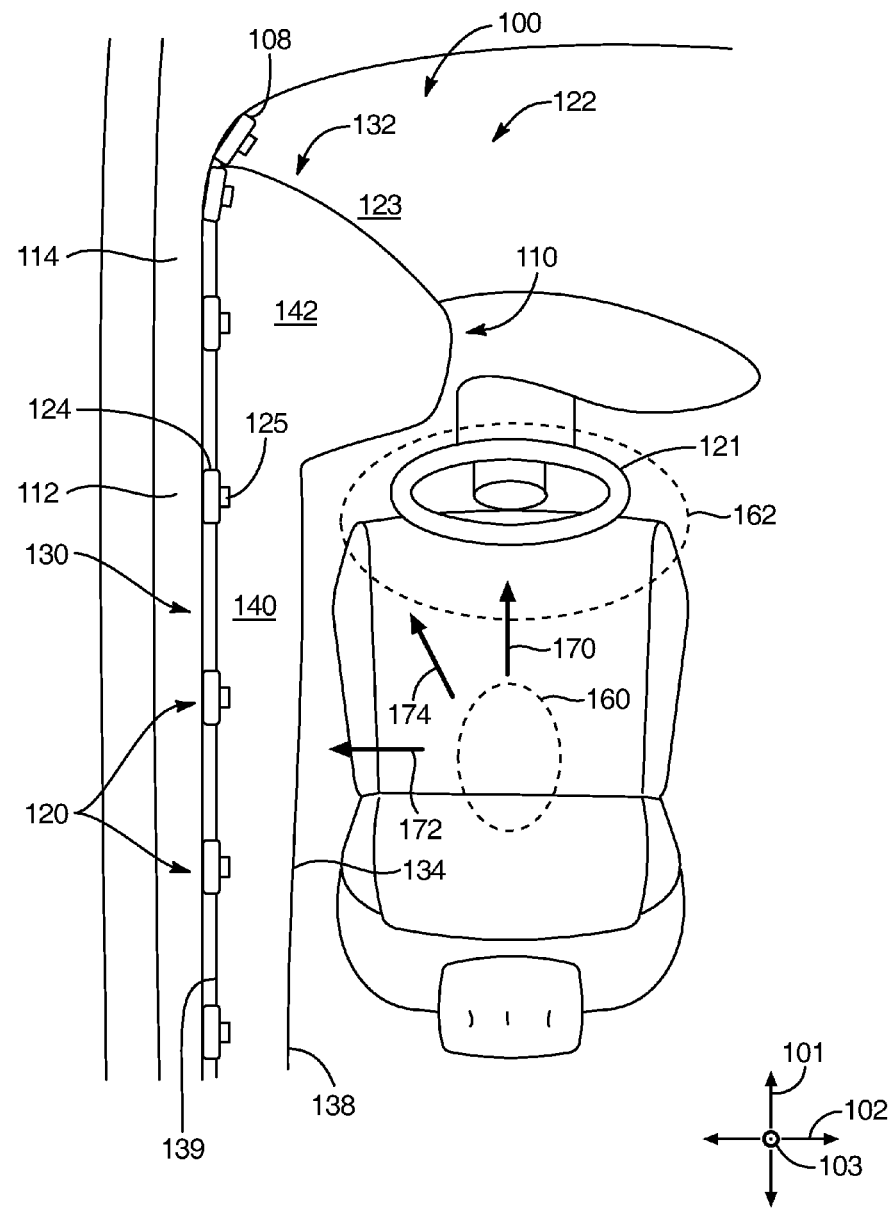
FIG. 3 is a top view of the airbag assembly of FIG. 1, wherein the inflatable curtain airbag is in the deployed configuration.

The inflatable curtain airbag 110 may be generally formed from two pieces of flexible material such as a fabric or thin polymer, and may include an inboard section 138 and an outboard section 139 (visible in FIG. 3). According to one example, the inflatable curtain airbag 110 is generally made from a woven nylon fabric, but other fabrics or flexible materials may be used. The inboard section 138 and the outboard section 139 may be separate pieces of fabric, or may be sections of a single piece of fabric folded together. The inboard section 138 and the outboard section 139 may be secured together via peripheral stitching 144, as shown. In the alternative, the inboard section 138 and the outboard section 139 may be secured together via mechanical fastening, adhesives, one-piece weaving, RF welding, ultrasonic welding, or any other suitable method known in the art.

The inboard section 138 and the outboard section 139 of the inflatable curtain airbag 110 may define a first chamber 140 within the first protection zone 130 and a second chamber 142 within the second protection zone 132. A "chamber" may be defined as an interior cavity within a body. The first chamber 140 may receive inflation gas from the inflator 104 via the fill tube 106. The second chamber 142 may receive inflation gas from the first chamber 140. As shown, the first chamber 140 may be divided into inflation cells 146 via interior stitching 148.

Referring to FIG. 3, a top view illustrates the airbag assembly 100 with the inflatable curtain airbag 110 in the deployed configuration. Additionally, FIG. 3 illustrates an occupant zone 160 that would ordinarily be occupied by a vehicle occupant's head, or more specifically, the driver's head, along with a deployed position 162 of an exemplary driver's side airbag.

Additionally, FIG. 3 shows a forward trajectory 170, an outboard trajectory 172, and a forward outboard trajectory 174 of the occupant's head relative to the vehicle. The forward trajectory 170 is where the head may move from the occupant zone 160 during an ordinary (i.e., not small overlap or oblique) frontal collision. The outboard trajectory 172 is where the head may move from the occupant zone 160 during a side impact, such as an impact against the side of the vehicle along which the inflatable curtain airbag 110 inflates. The forward outboard trajectory 174 is where the head may move from the occupant zone 160 during a small overlap collision.

As shown, the forward outboard trajectory 174 results from a rotation of the vehicle caused by the small overlap or oblique collision and may tend to move the occupant's head outboard of the steering wheel 121 to impact the A-pillar 114 and/or the outboard portion 123 of the instrument panel 122. The presence of the second protection zone 132 may serve to protect the head from such an impact. Thus, the second protection zone 132 may enable the airbag assembly 100 to provide enhanced protection in the event of a rollover, small overlap, or oblique collision.

Depending on the layout of the interior stitching 148, the second protection zone 132 may inflate generally simultaneously with the first protection zone 130, or may only inflate after inflation of the first protection zone 130 has substantially completed. If the interior stitching 148, or more specifically, a chamber divider 150 of the interior stitching 148, is positioned to restrict inflation gas flow from the first protection zone 130 into the second protection zone 132, inflation of the second protection zone 132 may be delayed to the extent desired.

The second protection zone 132 may interact with the various interior structures of the vehicle, such as the A-pillar 114, the instrument panel 122, and the steering wheel 121. For example, the second protection zone 132 may butt up against any of these structures during deployment to provide some frictional engagement that helps the second protection zone 132 to remain in place during the potential impact of the occupant's head with the second protection zone 132.

The airbag assembly 100 is shown in use on the driver's side of the vehicle. A similarly configured (i.e., mirror image or near-mirror image) airbag assembly may be used on the passenger's side of the vehicle in addition or in the alternative to the airbag assembly 100. Such an airbag assembly may have a second protection zone similar to the second protection zone 132 to protect the front passenger from impact against the interior surfaces that correspond to the A-pillar 114, the steering wheel 121, and the outboard portion 123 of the instrument panel 122. For example, the passenger's side may have an A-pillar, glove compartment, dashboard, and/or instrument panel that may be beneficially covered by such a second protection zone.

The configuration of the airbag assembly 100 is merely exemplary. A variety of types and configurations of inflatable curtain airbags may be utilized within the scope of the present disclosure. For example, in alternative embodiments, varying sizes, shapes, and proportions of inflatable curtain airbags may be used. An automaker may select from such alternative embodiments based on the desired location within the vehicle, the anticipated collision type and severity, the likely habits of vehicle occupants, and any other criteria recognized by those of skill in the automotive safety arts.

In the embodiment of FIGS. 1-3, the second protection zone 132 may generally be stowed within the trim attached to the A-pillar 114. This may be suitable for some vehicles. However, in some embodiments, it may be desirable to minimize the airbag structure stowed on and/or secured to the A-pillar 114. Some vehicles, and in particular, compact cars, may have very limited space within the trim attached to the A-pillar 114. Additionally, it may be desirable to minimize the risk that any A-pillar trim elements or other components will be projected into the vehicle interior during deployment. Hence, in alternative embodiments, a second protection zone may be stored elsewhere.

Figure 4:
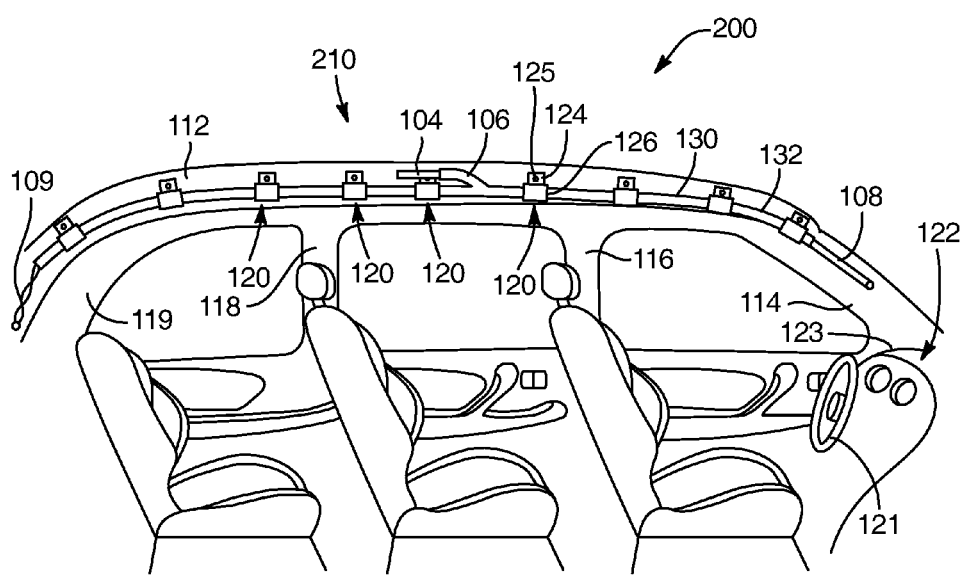
FIG. 4 is a side elevation view of an airbag assembly in a stowed configuration within a vehicle according to one alternative exemplary embodiment of the invention.
Figure 4:
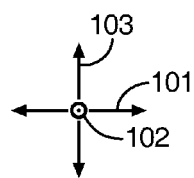

Referring to FIG. 4, a side elevation view illustrates an airbag assembly 200 according to an alternative exemplary embodiment of the invention, with an inflatable curtain airbag 210 in a stowed configuration within a vehicle. Like the airbag assembly 100, the airbag assembly 200 may include an inflator 104 connected to the inflatable curtain airbag 210 via a tube 106, and a forward tether 108 and a rearward tether 109 that cooperate to provide tension to keep the inflatable curtain airbag 210 in position upon deployment. The inflatable curtain airbag 210 may be secured to the roof rail 112 via a plurality of mounting assemblies 120, each of which may include a tab 124, a fastener 125, and a wrapper 126. As in the previous embodiment, the wrappers 126 may break open during initial inflation of the inflatable curtain airbag 210 to permit deployment of the inflatable curtain airbag 210.

The inflatable curtain airbag 210 may be designed to minimize the need for storage of or attachment of airbag components to the A-pillar 114. Thus, the inflatable curtain airbag 210 may have a design in which the portions of the inflatable curtain airbag 210 that deploy forward of the steering wheel 121 are positioned adjacent to the forward portion of the roof rail 112 rather than stored within the trim on the A-pillar 114. More specifically, the inflatable curtain airbag 210 may have a first protection zone 230 that deploys generally rearward of the steering wheel 121, and a second protection zone 232 that deploys generally forward of the steering wheel 121. In the stowed configuration, the second protection zone 232 may be folded rearward to overlie the first protection zone 230. The term "overlie" refers to two objects with outward-facing surfaces that are positioned against each other.

Thus, the package defined by the inflatable curtain airbag 210 in the stowed configuration of FIG. 4 may be somewhat larger proximate the forward portion of the roof rail 112 than that of the inflatable curtain airbag 110 of the previous embodiment. None of the mounting assemblies 120 need be secured to the A-pillar 114. This leaves the A-pillar 114 free of airbag components apart from the forward tether 108. This may minimize the bulk of material stored within the trim on the A-pillar 114. Further, such a configuration may enhance the overall safety level of the airbag assembly 200 by reducing the risk of airbag components being projected from the A-pillar or the A-pillar trim during deployment of the airbag assembly 200.

Figure 5:
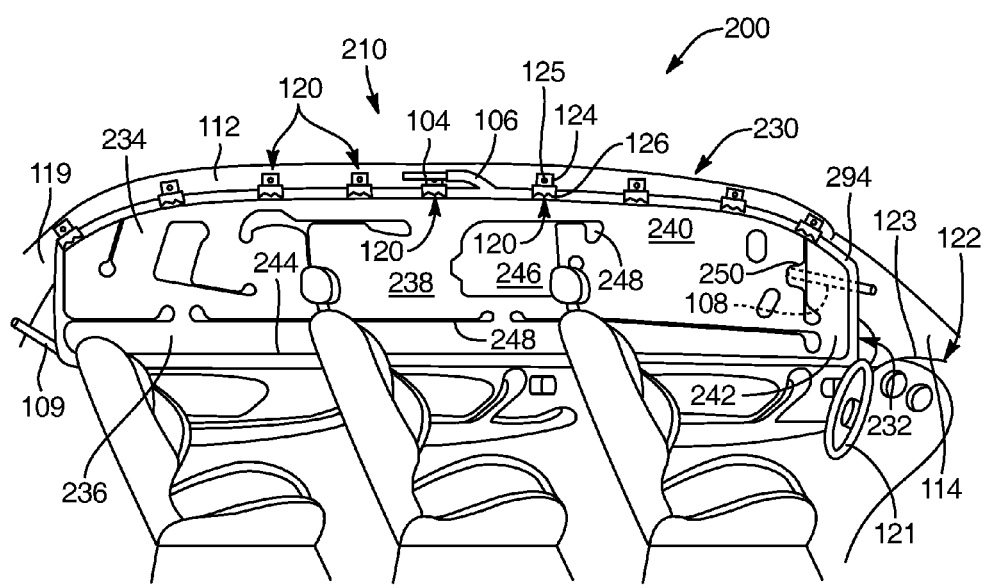
FIG. 5 is a side elevation view of the airbag assembly of FIG. 4, wherein the inflatable curtain airbag is in a deployed configuration.
Figure 5:
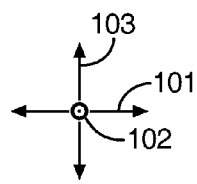

Referring to FIG. 5, a side elevation view illustrates the airbag assembly 200 of FIG. 4, with the inflatable curtain airbag 210 in the deployed configuration. Deployment may initially occur substantially as set forth above in the description of the airbag assembly 100 of FIGS. 1-3. Thus, as shown, the wrappers 126 may break open to release the inflatable curtain airbag 210, and the inflatable curtain airbag 210 may extend downward to protect occupants of the vehicle from impact against the lateral surfaces of vehicle.

As shown, the inflatable curtain airbag 210 has a configuration generally similar to that of the inflatable curtain airbag 110, with some differences. The inflatable curtain airbag 210 may have an upper portion 234 and a lower portion 236. The inflatable curtain airbag 210 may be formed by an inboard section 238 and an outboard section 239 that are secured together through any of the methods mentioned previously with peripheral stitching 244 and interior stitching 248. The inboard section 238 and the outboard section 239 may cooperate to define a first chamber 240 within the first protection zone 230 and a second chamber 242 within the second protection zone 232. The boundaries of the first chamber 240 and the second chamber 242 may be defined by the geometry of the peripheral stitching 244 and the interior stitching 248.

The inflatable curtain airbag 210 may not have inflation cells like the inflation cells 146 of the previous embodiment, but may, instead, have a plurality of non-inflating regions 246 defined by the interior stitching 248. The non-inflating regions 246 may be positioned proximate areas where impact from a vehicle occupant is unlikely, or where it is desirable to attach a tether or another airbag component. Such attachment may beneficially be done at the non-inflating regions 246 because the attachment can be carried out through the inboard section 238 and the outboard section 239 without impeding the inflation of the inflatable curtain airbag 210. The non-inflating regions 246 may also serve to reduce the volume of the inflatable curtain airbag 210 in the deployed configuration, thereby reducing the amount of inflation gas required, and thence, the size of the inflator 104.

A chamber divider 250 of the interior stitching 248 may be positioned between the first protection zone 230 and the second protection zone 232, and may thus separate the first chamber 240 from the second chamber 242. The chamber divider 250 may restrict the flow of inflation gas from the first chamber 240 into the second chamber 242, and may thus cause the first protection zone 230 to inflate generally prior to inflation of the second protection zone 232.

The second protection zone 232 may be much different from the second protection zone 132 of the previous embodiment in that the second protection zone 232 may be much more compact, and may be relatively narrow when deployed. This may help ensure that the inflatable curtain airbag 210, and particularly the enlarged, forward portion of the inflatable curtain airbag 210 where the second protection zone 232 overlies the first protection zone 230, compacts into the space provided for it in the trim for the roof rail 112.

During deployment, the inflation of the first protection zone 230 and the second protection zone 232 may cause the second protection zone 232 to generally pivot forward from its stowed position overlying the first protection zone 230. Thus, the second protection zone 232 may first pivot inboard until it extends in the lateral direction 102, wherein it is generally perpendicular to the first protection zone 230. From this position, the second protection zone 232 may continue to pivot forward, but now may pivot outboard. If left unchecked, this motion may continue until the second protection zone 232 is generally parallel to the first protection zone 230. The level of tension exerted by the forward tether 108 on the second protection zone 232 may generally control the angle at which the second protection zone 232 is positioned upon full deployment of the inflatable curtain airbag 210.

If the second protection zone 232 fully unfolds, i.e., pivots outboard until it is generally parallel to the first protection zone 230, it may be in a position suitable for providing supplemental side impact and rollover protection, but may no longer be optimally positioned to prevent impact of the occupant in the event of a small overlap or oblique collision. More precisely, such positioning may allow the driver's head to move along the forward outboard trajectory 174 as shown in FIG. 3, and move between the second protection zone 232 and the driver's side airbag. Thus, it may be desirable to provide some mechanism for unfolding the second protection zone 232 to a position generally parallel to the first protection zone 230 in the event of a side impact and/or rollover collision, while unfolding the second protection zone 232 to an angle of less than 180° relative to the first protection zone 230, as viewed from the top, in the event of a small overlap collision. This may be accomplished through the manner in which the forward tether 108 is secured to the inflatable curtain airbag 210 and to the A-pillar 114, as will be shown and described in FIGS. 6-8.

The second protection zone 232 may advantageously extend to a height proximate the roof of the vehicle. As a result, after deployment, a top edge 294 of the second protection zone 232 may be positioned proximate to and/or parallel to the roof of the vehicle. This may enable the second protection zone 232 to provide protection for taller individuals, and may also help the second protection zone 232 to cushion against impact with the higher lateral surfaces of the vehicle such as the upper portion of the A-pillar 114. Further, the height of the second protection zone 232 may be needed to effectively block the gap that may otherwise exist between the first protection zone 230 and the driver's side airbag, as illustrated at 162 of FIG. 3. A second protection zone (not shown) with a lower top edge may, when inflated, may leave a gap between its top edge and the roof or the window, through which a person's body part may pass to contact the lateral surfaces and/or the instrument panel 122.

Further, the relative height of the second protection zone 232 may provide more effective cushioning because it may be positioned relatively closer to the part of the vehicle occupant needing protection (such as the head) than a similar cushion of lower height. This positioning may enable the second protection zone 232 to receive the body part earlier, and retard its motion over a greater distance, thereby providing gentler cushioning. Yet further, the height of the second protection zone 232 may enable the top edge 294 to engage interior components of the vehicle, such as the roof, headliner trim, and/or windshield, in a manner that helps properly position the second protection zone 232 and/or keep the second protection zone 232 in place as it receives contact from an occupant. Orientation of the top edge 294 generally parallel to the roof of the vehicle may enhance many of the benefits provided by the height of the second protection zone 232.

Figure 6:
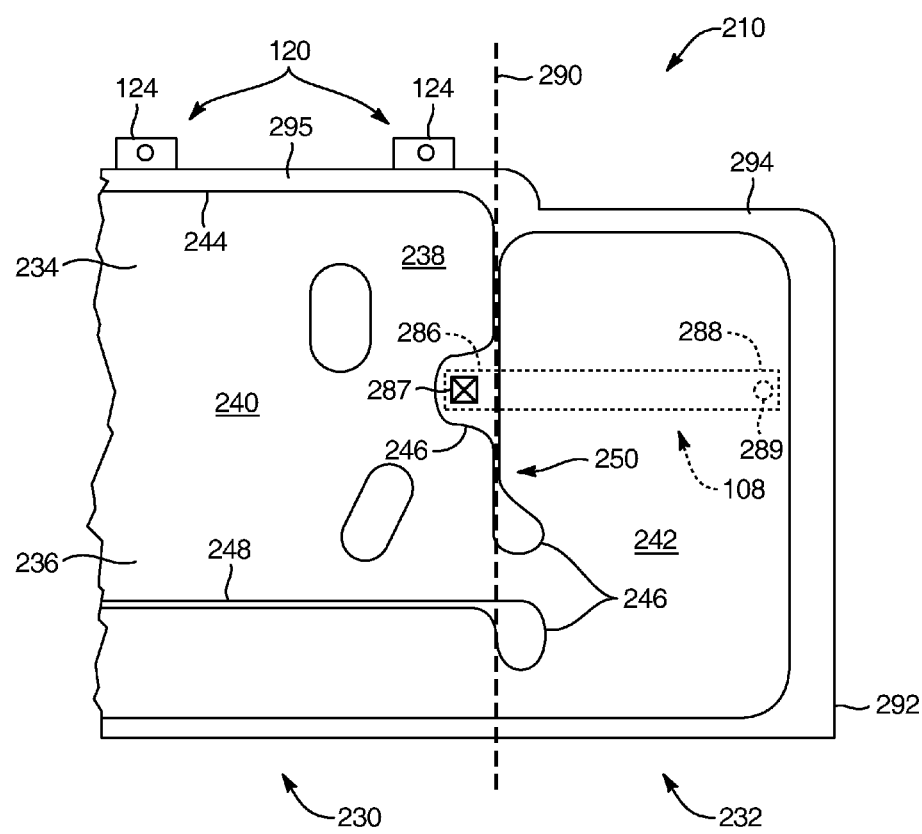
FIG. 6 is a side elevation view of the forward portion of the inflatable curtain airbag of the airbag assembly of FIG. 4, prior to compaction of the inflatable curtain airbag into the stowed configuration.

Referring to FIG. 6, a side elevation view illustrates the forward portion of the inflatable curtain airbag 210 of the airbag assembly 200 of FIG. 4, prior to compaction of the inflatable curtain airbag 210 into the stowed configuration. The second protection zone 232 may have a forward edge 292 in addition to the top edge 294. The top edge 294 may extend parallel to a top edge 295 of the first protection zone 230, and may be nearly of a same height with the top edge 295 upon inflation of the inflatable curtain airbag 210.

As shown, the chamber divider 250 may extend along most of the height of the inflatable curtain airbag 210 between the first chamber 240 and the second chamber 242. The forward tether 108 may have a first end 286 secured to the inflatable curtain airbag 210 and a second end 288 securable to the vehicle. The first end 286 may be secured to the chamber divider 250, and more specifically, may be secured to a non-inflating region 246 that extends from the remainder of the chamber divider 250. The first end 286 may be secured to the region 246 via stitching 287. The second end 288 may have a hole 289 or other feature that facilitates attachment of the second end 288 to the A-pillar 114, for example, through the use of a fastener (not shown). Although the forward tether 108 is shown in FIG. 6 as not extending beyond forward edge 295, it should be understood that the forward tether 108 may extend beyond forward edge 295, either because forward tether 108 is made longer or because the breadth of second protection zone is reduced.

The chamber divider 250 may also form a natural fold line where, in the deployed configuration, the inflatable curtain airbag 210 is able to remain partially folded. It may be difficult to fold the inflatable curtain airbag 210 at other locations because the pressure of the inflation gas within the inflatable curtain airbag 210 and the manner in which the inflatable curtain airbag 210 bulges outward in the lateral direction 102 may tend to keep most regions of the inflatable curtain airbag 210 from bending away from the longitudinal direction 101. However, as the chamber divider 250 may extend along most of the height of the inflatable curtain airbag 210, the chamber divider 250 may provide a natural fold line. Nevertheless, to stow the inflatable curtain airbag 210 prior to deployment, it should be understood the second protection zone 232 can be folded other than at the natural fold line provided by chamber divider 250 (e.g., anywhere to the right of the chamber divider 250 in the view of FIG. 6). In fact, in the configuration mentioned in the paragraph above, where the forward tether extends belong forward edge 295, the protection zone 2332 may remain unfolded and at least a portion thereof may be stowed along the A-pillar 114.

The second chamber 242 of the second protection zone 232, as shown, is a single chamber. However, it should be understood that the second chamber 242 could be divided into multiple chambers without departing from the spirit of the invention. For example, the second chamber 242 could be divided into two adjacent chambers, a forward most chamber and an intermediate chamber. The intermediate chamber could have the chamber divider 250 at one side and the divider between the forward most chamber and the intermediate chamber at the other side. An airbag configuration with an intermediate chamber and a forward most chamber may align better along the contour of the side door, A-pillar, and instrument panel. One embodiment of the invention could have the intermediate chamber positioned to cushion the vehicle occupant from impacting the A-pillar and the forward most chamber positioned to cushion the vehicle occupant from impacting the instrument panel. With this alternative exemplary embodiment, another natural fold line may be presented at the divider between the forward most chamber and the intermediate chamber (not shown for brevity and so as not to obscure, but understandable to a person of skill in the art from this description and reference to FIG. 6). Of course, if folded at this other natural fold line, depending upon where the divider is located, it is possible that no portion of the second protection zone 232 will overlie the first protection zone 230. Rather, the folded over portion of the second protection zone may only overlie another portion of the second protection zone 232. Additionally, a person of skill in the art, armed with the present disclosure, could also determine a configuration using multiple chambers that would protect a vehicle occupant for a particular vehicle configuration.

In the exemplary embodiment shown in FIG. 6, the inflatable curtain airbag 210 may be folded at a stowed fold line 290 to compact it into the stowed configuration. In this instance, the stowed fold line 290 is the same as the natural fold line defined by the chamber divider 250. In alternative embodiments, the inflatable curtain airbag 210 may be folded at a different location, i.e., either forward or rearward of the chamber divider 250. The location of the stowed fold line may have little impact on the fully deployed configuration of the inflatable curtain airbag 210 because the chamber divider 250 may determine where the fold is located in the deployed configuration.

The attachment location of the first end 286 of the forward tether 108 may be selected to provide the desired level of tension on the second protection zone 232. More specifically, securing the first end 286 forward of the chamber divider 250 may cause the forward tether 108 to exert tension in the longitudinal direction 101 on not only the first protection zone 230, but on the second protection zone 232 as well. Such tension may help unfold the second protection zone 232 by helping pivot the second protection zone 232 forward during deployment, but may also act to draw the second protection zone 232 toward a position in which the second protection zone 232 is parallel to the first protection zone 230. As set forth above, in some instances, this may not be desirable.

Securing the first end 286 rearward of the chamber divider 250 may cause the forward tether 108 to exert tension in the longitudinal direction 101 on only the first protection zone 230. Securing the first end 286 directly on the chamber divider 250, or forward of, but close to, the chamber divider 250, may cause the forward tether 108 to exert some level of tension on the second protection zone 232, but with a short moment arm so that the resulting moment tending to pivot the second protection zone 232 forward is relatively small.

Hence, the attachment point of the first end 286 may be carefully selected to obtain the desired balance between expeditious deployment of the second protection zone 232 and maintenance of the second protection zone 232 at the proper orientation to provide protection in the event of a small overlap, oblique, or rollover collision. In the exemplary embodiment of FIG. 6, the first end 286 may be secured to the non-inflating region 246 of the chamber divider 250, which extends generally rearward of the remainder of the chamber divider 250. Thus, as configured in FIG. 6, the forward tether 108 may exert little, if any, longitudinal tension on the second protection zone 232.

According to one example, the inflatable curtain airbag 210 may be folded inboard at the stowed fold line 290. Thus, the forward edge 292 may be brought inboard, or out of the page with reference to the view of FIG. 6, and then brought rearward (or to the left in the view of FIG. 6) until the forward edge 292 overlies the corresponding region of the first protection zone 230. The fold line 290 may then be the forward edge of the inflatable curtain airbag 210.

After the inflatable curtain airbag 210 has been folded in the longitudinal direction 101, the inflatable curtain airbag 210 may be rolled, folded, or otherwise compacted in the transverse direction 103. This may provide the elongated shape of the inflatable curtain airbag 210 in the stowed configuration. With the inflatable curtain airbag 210 in the stowed configuration, the mounting assemblies 120 may easily be secured to the roof rail 112 to install the inflatable curtain airbag 210 in the vehicle. As mentioned previously with this embodiment, none of the mounting assemblies 120 need be secured to the A-pillar 114.

Figure 7:
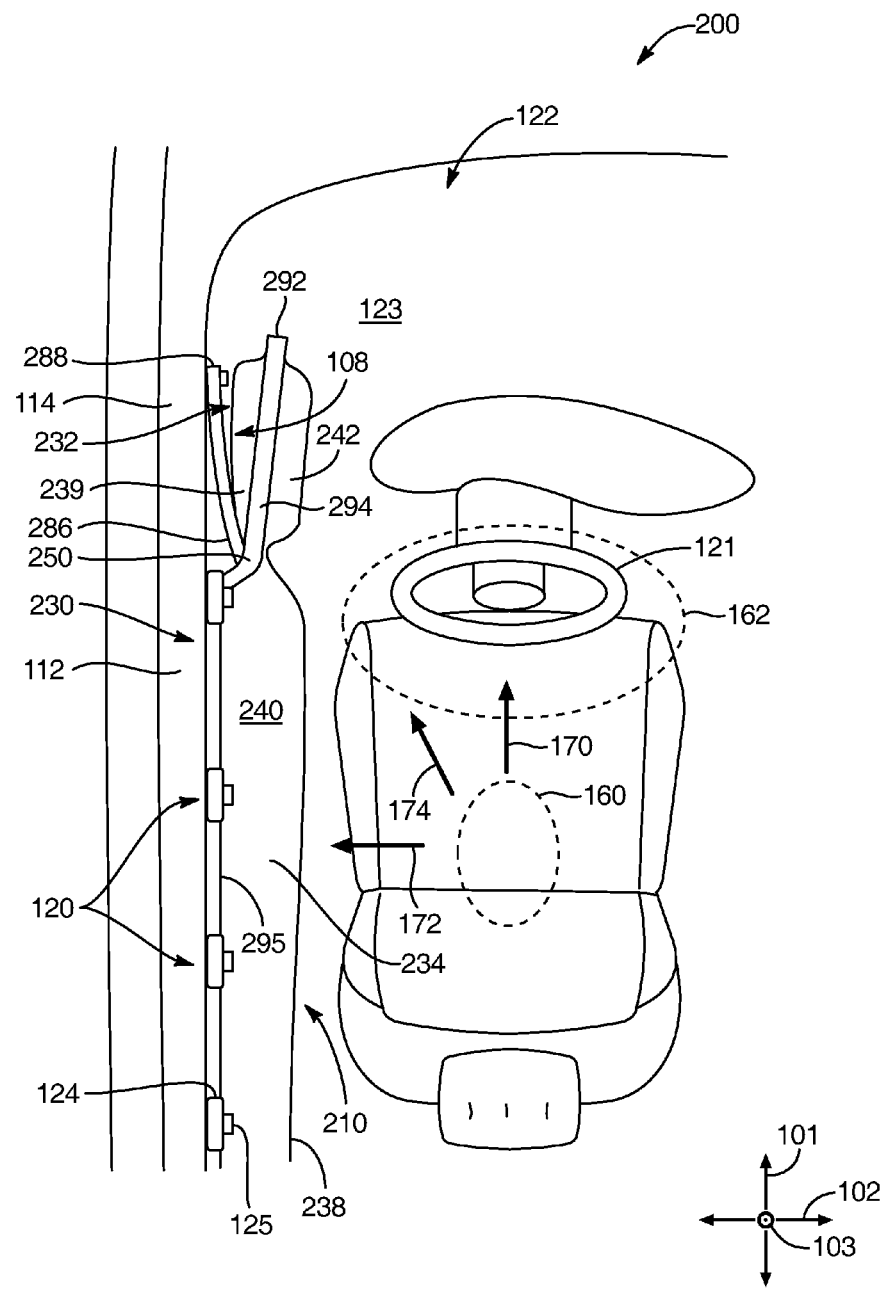
FIG. 7 is a top view of the airbag assembly of FIG. 4, wherein the inflatable curtain airbag is in the deployed configuration in response to a side impact or rollover collision.

Referring to FIG. 7, a top view illustrates the airbag assembly 200 of FIG. 4, wherein the inflatable curtain airbag 210 is in the deployed configuration in response to a side impact or rollover collision. The A-pillar 114 may be substantially undeflected as shown. Thus, the forward tether 108 may act to exert some tension in the longitudinal direction 101 on the second protection zone 232 to unfold the second protection zone 232 and/or keep the second protection zone 232 unfolded at an angle approaching 180° relative to the first protection zone 230.

Figure 8:
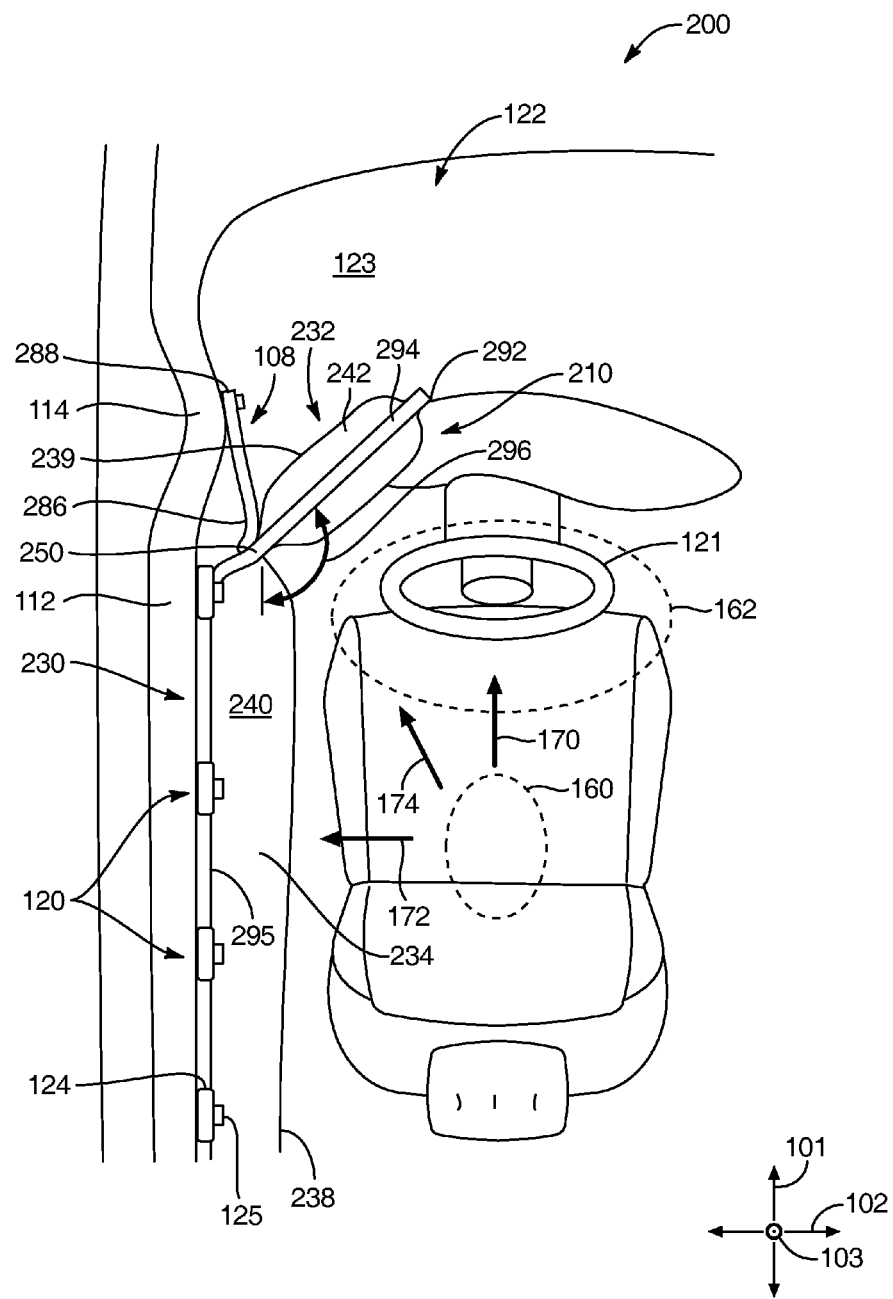
FIG. 8 is a top view of the airbag assembly of FIG. 4, wherein the inflatable curtain airbag is in the deployed configuration in response to a small overlap collision.

The second protection zone 232 may have unfolded to a position substantially parallel to the first protection zone 230. Such a position may be beneficial for providing supplemental rollover protection by protecting vehicle occupants from impact against the lateral surfaces of the vehicle that lie outboard of the second protection zone 232. However, this position may not be ideal for other collision situations such as a small overlap or oblique collision. By way of example, with the second protection zone 232 positioned as shown in FIG. 7, the driver's head, which is ordinarily positioned at the occupant zone 160, may move along the forward outboard trajectory 174 to contact the A-pillar 114 and/or the outboard portion 123 of the instrument panel 122. Hence, it may be desirable to position the second protection zone 232 at a different location in the event of a small overlap or oblique collision. FIG. 8 shows one manner in which such positioning may be accomplished.

Referring to FIG. 8, a top view illustrates the airbag assembly 200 of FIG. 4, wherein the inflatable curtain airbag 210 is in the deployed configuration in response to a small overlap or oblique collision. One manner in which this may occur is via deformation of the A-pillar 114, for example, in response to a small overlap or oblique collision occurring on the driver's side of the vehicle. Such a collision may cause relatively large deflection of the vehicle structures on the driver's side due to the fact that the impact forces may be concentrated along a relatively narrow portion of the vehicle. Thus, deformation of the A-pillar 114 may be likely in the event of a small overlap or oblique collision. Such deformation may be likely to move the center of the A-pillar rearward and/or inboard.

Deformation of the A-pillar 114 may cause the second end 288 of the forward tether 108 to move from its ordinary location. It may ordinarily be secured at an anchoring location proximate the center of the A-pillar 114, which may be a location likely to deflect rearward and/or inboard in the event of such a small overlap or oblique collision. As shown in FIG. 8, the anchoring location of the second end 288 has moved significantly inboard of the position shown in FIG. 7. The result may be that the tension ordinarily exerted by the forward tether 108 on the second protection zone 232 is relieved, allowing the second protection zone 232 to be positioned at the orientation shown in FIG. 8.

As shown, the second protection zone 232 has unfolded from the first protection zone 230 and is at a position nonparallel to the first protection zone 230. The second protection zone 232 may be positioned to block the gap between the first protection zone 230 and the position 162 of the driver's side airbag. The second protection zone 232 may thus be positioned generally between the occupant zone 160 of the occupant's head and the A-pillar 114 and the outboard portion 123 of the instrument panel 122, thereby providing protection from impact against these surfaces.

The inflatable curtain airbag 210 may remain folded at the chamber divider 250, which defines the natural fold line of the inflatable curtain airbag 210. As mentioned previously, the stowed fold line of the inflatable curtain airbag 210 may also be at the chamber divider 250, but in alternative embodiments, this need not be the case. A natural fold line at a different location from the chamber divider 250 may or may not affect the configuration of the deployed inflatable curtain airbag.

As shown in FIG. 8, the second protection zone 232 may unfold at an angle 296 relative to the first protection zone 230. The angle 296 may be determined by the level of tension provided by the forward tether 108, the engagement of the top edge 294 of the second protection zone 232 with interior surfaces of the vehicle, and the geometry of the inflatable curtain airbag 210. The angle 296 may advantageously be less than 180°. The angle 296 may fall within the range of 110° to 160°. More precisely, the angle 296 may fall within the range of 120° to 150°. Yet more precisely, the angle 296 may fall within the range of 130° to 140°. Still more precisely, the angle 296 may be about 135°.

There are multiple sequences of events that may lead to the positioning of the inflatable curtain airbag 210 illustrated in FIG. 8. The second protection zone 232 may inflate generally simultaneously with the inflation of the first protection zone 230, or may inflate after the first protection zone 230 has substantially fully inflated. The deformation of the A-pillar 114 may occur rapidly enough that the second protection zone 232 does not ever pivot fully forward to reach a position parallel to the first protection zone 230, like that shown in FIG. 7. Alternatively, the deformation of the A-pillar 114 may occur after the second protection zone 232 has fully unfolded forward into the configuration of FIG. 7. The subsequent deformation of the A-pillar 114 may then allow the second protection zone 232 to pivot rearward and inboard from the position shown in FIG. 7 to that of FIG. 8.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention. Embodiments of the invention in which an exclusive property or privilege is claimed are defined as follows.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An airbag assembly for disposition proximate a roof of a vehicle to shield a vehicle occupant from impacting at least one lateral surface of the vehicle or a portion of an instrument panel during a rollover or during side impact, small overlap and oblique collisions, the airbag assembly comprising:
an inflatable curtain airbag having a stowed configuration proximate the roof of the vehicle and a deployed configuration into which the inflatable curtain airbag deploys, the inflatable curtain airbag deploys downward between the vehicle occupant and the at least one lateral surface of the vehicle and angled inboard between the portion of the instrument panel and the vehicle occupant, the inflatable curtain airbag comprising:
a first protection zone comprising a first interior chamber; and
a second protection zone comprising a second interior chamber in fluid communication with the first interior chamber;
a divider that defines the first interior chamber as distinct from the second interior chamber, the divider forming a fold line and restricting inflation gas flow from the first protection zone into the second protection zone during deployment;
a forward tether comprising a first end secured to the inflatable curtain airbag and a second end securable to an A-pillar of the vehicle;
wherein, in the stowed configuration, the inflatable curtain airbag is folded at the fold line such that the second protection zone lies alongside a portion of the first protection zone;
wherein, during deployment, the inflatable curtain airbag unfolds at the fold line such that the second protection zone pivots forward about the divider to be positioned both forward of the first protection zone and angled inboard between the vehicle occupant and the at least one lateral surface of the vehicle and the portion of the instrument panel in the deployed configuration, the forward tether applying some level of tension to the second protection zone tending to facilitate the pivoting of the second protection zone forward and to control the angled inboard disposition of the second protection zone to the first protection zone; and
wherein, in the deployed configuration, the second protection zone extends to a height proximate the roof of the vehicle.

2. The airbag assembly of claim 1, wherein the second protection zone comprises a top edge, wherein, in the deployed configuration, the top edge is substantially parallel to the roof of the vehicle.

3. The airbag assembly of claim 1, wherein, in the stowed configuration, the first and second protection zones are rolled together after folding of the inflatable curtain airbag at the fold line.

4. The airbag assembly of claim 1, wherein, in the stowed configuration, the fold line defines a forward edge of the inflatable curtain airbag; and
wherein, in the deployed configuration, the second protection zone is positioned between an occupant zone that would ordinarily be occupied by the vehicle occupant's head and at least one of an A-pillar of the vehicle and the instrument panel portion of the vehicle.

5. The airbag assembly of claim 4, wherein in the deployed configuration, the second protection zone at the fold line defines an angle falling within the range of about 110° to about 160° relative to the first protection zone.

6. The airbag assembly of claim 4, wherein in the deployed configuration, the second protection zone at the fold line defines an angle falling within the range of about 120° to about 150° relative to the first protection zone.

7. The airbag assembly of claim 4, wherein the second end of the forward tether is secured to an anchoring location on the A-pillar that is likely to move rearward in response to deflection of the A-pillar during small overlap or oblique collisions to release tension in the forward tether, thereby facilitating inboard positioning of the second protection zone.

8. The airbag assembly of claim 7, wherein the first end of the forward tether is secured to the second protection zone proximate the fold line at or forward of the fold line so that tension in the forward tether facilitates inboard pivoting of the second protection zone.

9. The airbag assembly of claim 1, further comprising:
a plurality of mounting assemblies distributed along a length of the inflatable curtain airbag to facilitate attachment of the inflatable curtain airbag to the vehicle; and
wherein in the stowed configuration, all of the plurality of mounting assemblies are positioned rearward of the A-pillar so that the second end of the forward tether is the only feature of the airbag assembly that is secured to the A-pillar.

10. The airbag assembly of claim 9, further comprising:
an inflator that produces gas in response to detection of impact to trigger deployment of the inflatable curtain airbag;
a rearward tether comprising a first end secured to the inflatable curtain airbag and a second end securable to the vehicle rearward of the inflatable curtain airbag; and
wherein, in the deployed configuration, the rearward tether and the forward tether cooperate to keep the first protection zone under tension in a longitudinal direction.

11. A method for stowing and deploying an airbag assembly, the airbag assembly deploying between a lateral surface of a vehicle having a roof and a vehicle occupant and deploying between the vehicle occupant and a portion of a vehicle instrument panel, the method comprising:
providing an inflatable curtain airbag comprising a first protection zone comprising a first interior chamber and a second protection zone comprising a second interior chamber in fluid communication with the first interior chamber;
securing a first end of a forward tether to the inflatable curtain airbag;
securing a second end of the forward tether to an A-pillar of the vehicle;
folding the inflatable curtain airbag at a fold line defined by a divider such that the second protection zone overlies at least a portion of the first protection zone, the divider defines the first interior chamber as distinct from the second interior chamber and restricts flow of inflation gas from the first interior chamber into the second interior chamber;
compacting the inflatable curtain airbag into a generally elongated shape; and
securing the inflatable curtain airbag proximate the roof of the vehicle such that, in response to introduction of inflation gas into the inflatable curtain airbag, the first protection zone expands downward to be positioned between the vehicle occupant and the lateral surface of the vehicle and the second protection zone pivots about the divider forward of the first protection zone; and
pivoting the second protection zone about the divider forward of the first protection zone to an angled inboard disposition relative to the first protection zone, wherein the forward tether applies some level of tension to the second protection zone tending to facilitate the pivoting of the second protection zone forward and to control the angled inboard disposition of the second protection zone to the first protection zone.

12. The method of claim 11, wherein the second protection zone comprises a top edge, wherein pivoting the second protection zone forward of the first protection zone comprises positioning the top edge of the second protection zone substantially parallel to the roof of the vehicle.

13. The method of claim 11, wherein securing the inflatable curtain airbag proximate the roof of the vehicle comprises positioning the inflatable curtain airbag such that, prior to deployment, the fold line defines a forward edge of the inflatable curtain airbag; and wherein pivoting the second protection zone forward of the first protection zone comprises positioning the second protection zone between an occupant zone that would ordinarily be occupied by the vehicle occupant's head and at least one of an A-pillar of the vehicle and the portion of the instrument panel of the vehicle.

14. The method of claim 11, wherein securing the first end of the forward tether to the inflatable curtain airbag comprises securing the first end proximate the fold line at or forward of the fold line so that release of tension in the tether facilitates inboard pivoting of the second protection zone.

15. The method of claim 14, wherein securing the second end of the forward tether to the A-pillar comprises securing the second end of the forward tether to an anchoring location on the A-pillar that is likely to move rearward in response to deflection of the A-pillar during a small overlap or oblique collision to release tension in the forward tether, thereby facilitating inboard positioning of the second protection zone.

16. The method of claim 11, wherein securing the inflatable curtain airbag proximate the roof of the vehicle comprises attaching a plurality of mounting assemblies distributed along a length of the inflatable curtain airbag to the vehicle rearward of the A-pillar so that the second end of the forward tether is the only feature of the airbag assembly that is secured to the A-pillar.

17. An airbag assembly, comprising:
an inflatable curtain airbag stowed proximate a roof of a vehicle, the inflatable curtain airbag comprising a first protection zone and a second protection zone folded against the first protection zone such that the second protection zone overlies at least a portion of the first protection zone;
an inflator in fluid communication with a first chamber within the first protection zone and a second chamber within the second protection zone;
a divider defines the first chamber as distinct from the second chamber and restricts fluid flow from the first chamber into the second chamber;
a plurality of mounting assemblies that secure the first protection zone to the vehicle; and
a forward tether comprising a first end secured to the inflatable curtain airbag at or forward of the divider and a second end secured to an A-pillar of the vehicle;
wherein, in response to production of fluid by the inflator, the inflatable curtain airbag expands downward such that the first protection zone is positioned between an occupant zone that would ordinarily be occupied by a vehicle occupant's head and a lateral surface of the vehicle;
wherein, in response to production of the fluid by the inflator, the second protection zone pivots forward of the first protection zone such that the second protection zone pivots forward about the divider to an angled inboard disposition relative to the first protection zone and between an occupant zone that would ordinarily be occupied by the vehicle occupant's head and at least one of an A-pillar of the vehicle and a portion of an instrument panel of the vehicle; and
wherein all of the plurality of mounting assemblies are positioned rearward of the A-pillar so that the second end of the forward tether is the only feature of the airbag assembly that is secured to the A-pillar.

18. The airbag assembly of claim 17, wherein, after deployment of the inflatable curtain airbag, the second protection zone extends to a height proximate the roof of the vehicle;
wherein the second protection zone comprises a top edge; and
wherein, after deployment of the inflatable curtain airbag, the top edge is substantially parallel to the roof of the vehicle.

19. The airbag assembly of claim 17, wherein the divider forms a fold line;
wherein, after deployment, the angled inboard disposition of the second protection zone at the fold line defines an angle falling within the range of about 110° to about 160° relative to the first protection zone; and
wherein the second end of the forward tether is secured to an anchoring location on the A-pillar that is likely to move rearward in response to deflection of the A-pillar during a small overlap or oblique collision to release tension in the forward tether, thereby facilitating inboard positioning of the second protection zone.

* * * * *